(12) United States Patent
Mitchell et al.

(10) Patent No.: US 7,289,890 B2
(45) Date of Patent: Oct. 30, 2007

(54) CHECKLIST SYSTEM

(75) Inventors: Bradley J. Mitchell, Snohomish, WA (US); James A. Poier, Snohomish, WA (US); Jeffrey L. Aimar, Seattle, WA (US)

(73) Assignee: The Boeing Company, Chicago, IL (US)

( * ) Notice: Subject to any disclaimer, the term of this patent is extended or adjusted under 35 U.S.C. 154(b) by 246 days.

(21) Appl. No.: 10/997,466

(22) Filed: Nov. 24, 2004

(65) Prior Publication Data

US 2007/0150119 A1 Jun. 28, 2007

(51) Int. Cl.
 *G05D 1/00* (2006.01)
(52) U.S. Cl. .................. 701/1; 701/9; 701/24; 701/29; 701/36; 340/438; 340/439
(58) Field of Classification Search .................. 701/1, 701/3, 9, 10, 11, 13, 24, 29, 36; 244/158.1, 244/75.1; 340/425.5, 438, 439
See application file for complete search history.

(56) References Cited

U.S. PATENT DOCUMENTS

| 4,970,683 | A | 11/1990 | Harshaw et al. |
| 5,454,074 | A | 9/1995 | Hartel |
| 5,522,026 | A | 5/1996 | Records |
| 2003/0025682 | A1* | 2/2003 | Dame .................. 345/184 |

FOREIGN PATENT DOCUMENTS

| GB | 1356075 | 11/1972 |
| GB | 2050979 | 5/1980 |

OTHER PUBLICATIONS

A.W. Gubbels et al., *The NRC Bell 412 Advanced Systems Research Aircraft—Facility description and results of safety system flight tests*, Aug. 2000.
D.R. Jones, *Three Input Concepts for Flight Crew Interaction With Information Presented on a Large-Screen Electronic Cockpit Display*, Apr. 1990, p. 25, illus 14 refs.
Media Dimensions Inc. et al., *Military Speech Tech 87*, Oct. 1986, p. 87.
R.A. North et al., *Systems Concept for Speech Technology Application in General Aviation*, Dec. 1984, p. 6.
R.A. North et al., *Application of Speech Recognition and Synthesis in the General Aviation Cockpit*, Jul. 1964, p. 6.
A.J. Aretz, *Comparison of Manual and Vocal Response Modes for the Control of Aircraft Subsystems*, Mar. 1983, p. 120.

(Continued)

*Primary Examiner*—Gertrude A. Jeanglaude
(74) *Attorney, Agent, or Firm*—Timothy K. Klintworth; Wildman, Harrold, Allen & Dixon, LLP

(57) ABSTRACT

A system is provided which provides an indication of checklist items, for example, in an aircraft. The system monitors aircraft systems and automatically prioritizes information gathered from those systems and selects and arms the appropriate checklist. The pilot may select and/or arm a checklist via a pilot-VCS (voice checklist system) interface. The system provides checklist prompting and step verification.

40 Claims, 3 Drawing Sheets

OTHER PUBLICATIONS

Z.A. Kersteen, *Human factors issues associated with the Use of Speech Technology in the Cockpit*, Dec. 1983, p. 83.
J.D. Wetherbee, *Voice Interactive Systems Technology Assessment*, 1983, p. 4.
C. Swail, *Direct Voice Input for Control of an Avionics Management System*, 1997, p. 7.
J.C. Maguire, *Cockpit Information Management and the Electronic Library*, Dec. 1991.
D.G. Curry, *A Comparative Evaluation of Subsystem Control and Cursor Positioning Methodologies for Aircraft Usage*, Apr. 1985.
J.C. Cotton, *Development of Speech Input/Output Interfaces for Tactical Aircraft*, Jul. 1983, p. 176.
Aerotel Ltd. v. Telco Holdings Patent Application GB0314464 in the name of Neal William Mocrossan (2006) EWCA Civ. 1371, see Par 40.

* cited by examiner

CHECKLIST SYSTEM

FIELD OF THE INVENTION

The invention is generally related to systems and methods for using a checklist, and specifically to checklist systems which use a synthetic or pre-recorded voice to broadcast checklist items over a speaker or headset.

BACKGROUND

Checklists were developed early in aviation as a safety mechanism. As aircraft became more complex, pilots committed more systems information and operating procedures to memory. Originally, checklists were used as memory joggers, but became a standard feature in most aircraft operations.

Checklist use is now considered very important to safe operations in commercial aviation as well as in many other industries, such as, those that involve the operation of complex machinery. As the content of checklists evolved, so did the way in which they were used. Pilots discovered that merely reading a checklist was often not enough to prevent mistakes in the operation of aircraft. Generally, procedures for using a checklist evolved, in that checks and backup mechanisms were built into these procedures. Typically, one pilot read the checklist while the other pilot performed the required action. The pilot reading the checklist confirmed that the second pilot had indeed performed the correct action. These procedures added levels of safety above and beyond the information content of the checklist alone and often saved an aircrew from performing the correct action on the wrong switch.

For example, in an emergency situation with an engine fire, the checklist may require the crew to shut down the engine that is on fire. This is usually accomplished by closing the fuel lever for the engine which stops the flow of fuel. If, during an already stressful situation, the pilot were to close the fuel lever for the wrong engine, the result may be catastrophic. In a situation such as this, the other pilot usually confirms that the pilot performing the checklist action has his/her hand on the correct fuel lever before closing it.

The ability of a multi-pilot crew to back each other up, especially in accomplishing checklist items, is an important safety factor. Federal Aviation Regulations eventually adopted a two-crew minimum requirement for all large commercial aircraft operations, whether the aircraft manufacturer required it or not.

Many small commercial aircraft and general aviation aircraft operate with only a single pilot. These aircraft do not have the advantage of a second pilot to facilitate reading of the checklist, carrying out the steps in the checklist or double checking the actions of the person carrying out the steps in the checklist.

Most aircraft rely on printed checklists. Recently, in light of the widespread incorporation of electronic flight displays, electronic versions of checklists have been developed. Most of these simply display the checklist on a multi-function display unit, however some will highlight the current checklist item on the display and allow the pilot to check off completion of the item. The primary goal of these electronic checklists is to mimic and supplement the paper checklist, not to reduce pilot workload.

Language differences are a drawback of paper and electronic checklists. Often, the aircraft will be operated by pilots whose native language is different than that used in the checklist. Although paper checklists are often easily translated and reproduced, the labels for the instruments and the writing on the instruments themselves may be very expensive to change. Often, the language on the instrument labels or the instruments themselves is not changed for monetary reasons, which can potentially cause confusion on the part of the pilots, especially during periods of high workload, e.g. takeoff and landing or emergencies. Therefore, performing the checklist in the native language of the pilots would produce a safety benefit.

Another drawback to paper checklists is they may be difficult to read during periods of reduced visibility in the cockpit, e.g., at night or if there is smoke in the cockpit. At times, checklist use may actually add to the pilot workload instead of reducing the workload. Often, pilots may be running multiple checklists at the same time and it may become confusing as to which checklist should take priority.

It would be desirable to have a system that provides or enhances the backup safety measures a second pilot provides, especially while accomplishing checklist items. The system would overcome the limitations of current-generation paper and electronic checklists while enhancing the safety of dual and single pilot operations.

SUMMARY

In accordance with one aspect of the invention, a system for audibly broadcasting a checklist procedure is provided. The system may include a processor adapted to run a software program, a memory accessible by the processor, a speaker, a sensor for sensing a condition of a vehicle, and a user interface device; wherein the memory contains one or more checklists. A user may control the system through a user interface device and the software program may access the memory, prioritize the checklists and broadcasts a first checklist item over the speaker. The system may also display the checklist on an electronic display of any sort and may incorporate the user interface device into such a display. The user interface may also include voice recognition technology. Further, the system may arm the checklist automatically based on an input from the sensor, or manually through the user interface device. Once armed and activated, the system may broadcast each checklist item over a speaker, monitor for the completion of the checklist item, and proceed to the next checklist item.

In accordance with another aspect of the invention, a method is provided for audibly broadcasting a checklist procedure. The method may include receiving a first input, prioritizing a first checklist, broadcasting a first checklist item over a speaker, receiving a second input indicating completion of the first checklist item and broadcasting a second checklist item over the speaker. Additionally, the method may include displaying the checklist items on an electronic display.

In accordance with yet another aspect of the invention, a system may include an electronic Voice Checklist System (VCS) which may be activated manually or automatically by a condition of an aircraft or by a condition of one or more aircraft systems. The VCS may use a synthetic or pre-recorded voice to audibly provide checklist items, decision steps and/or systems status to a pilot. Completion of each item in the checklist and advancement to the next item may be either automatic, based on feed-back to the VCS from aircraft systems, or manual, when initiated by the pilot. The VCS may be configured to detect dependent aircraft conditions through an interface with other aircraft systems.

DETAILED DESCRIPTION

Figure 1:
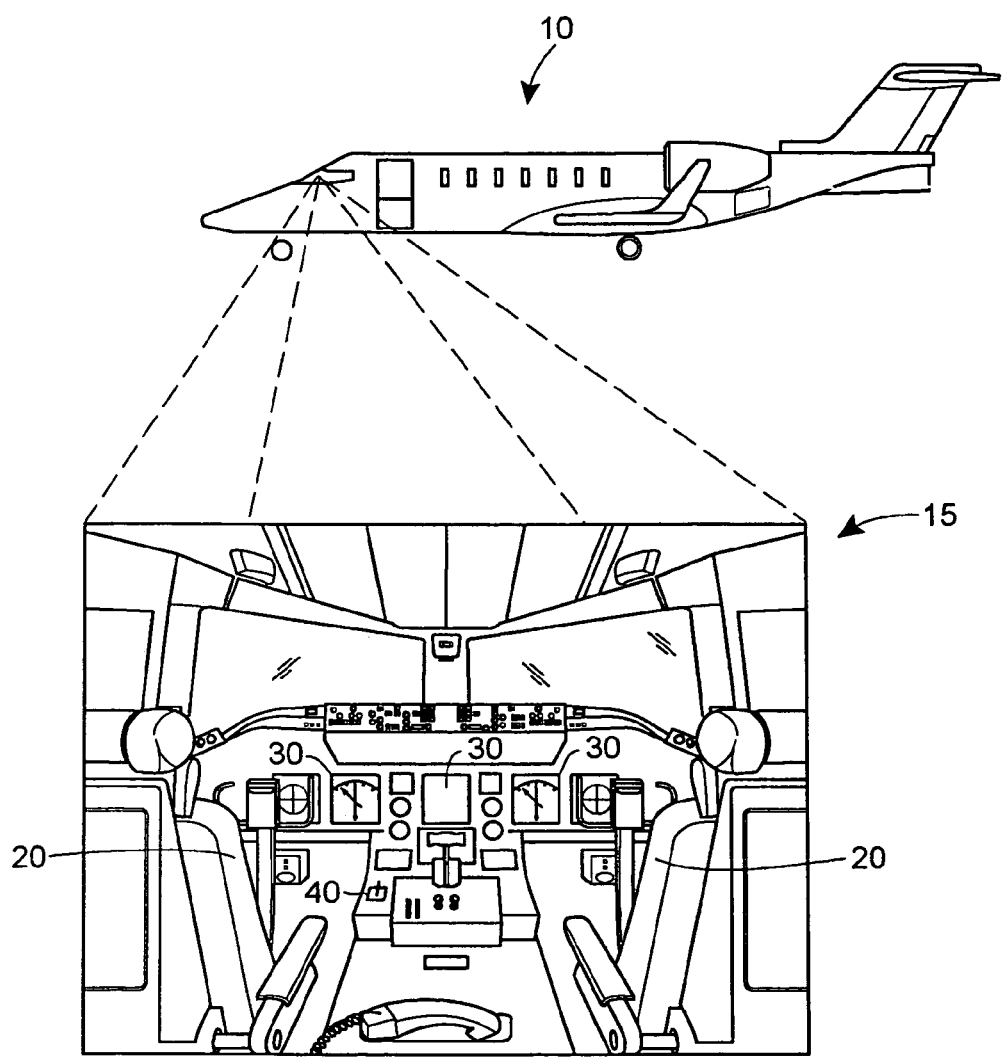
FIG. 1 is a representation of a typical aircraft cockpit and one possible location for the pilot interface of a checklist system.

FIG. 1 shows an aircraft 10 which contains a flight deck 15. The flight deck 15 generally includes positions 20 for two or more pilots. The VCS may be operatively connected to a display 30 and may include a pilot-VCS interface device 40. The locations of the display 30 and the pilot-VCS interface device 40 as shown in FIG. 1 are examples only. Actual locations are either determined by the aircraft manufacturer or are selectable by the user.

Figure 2:
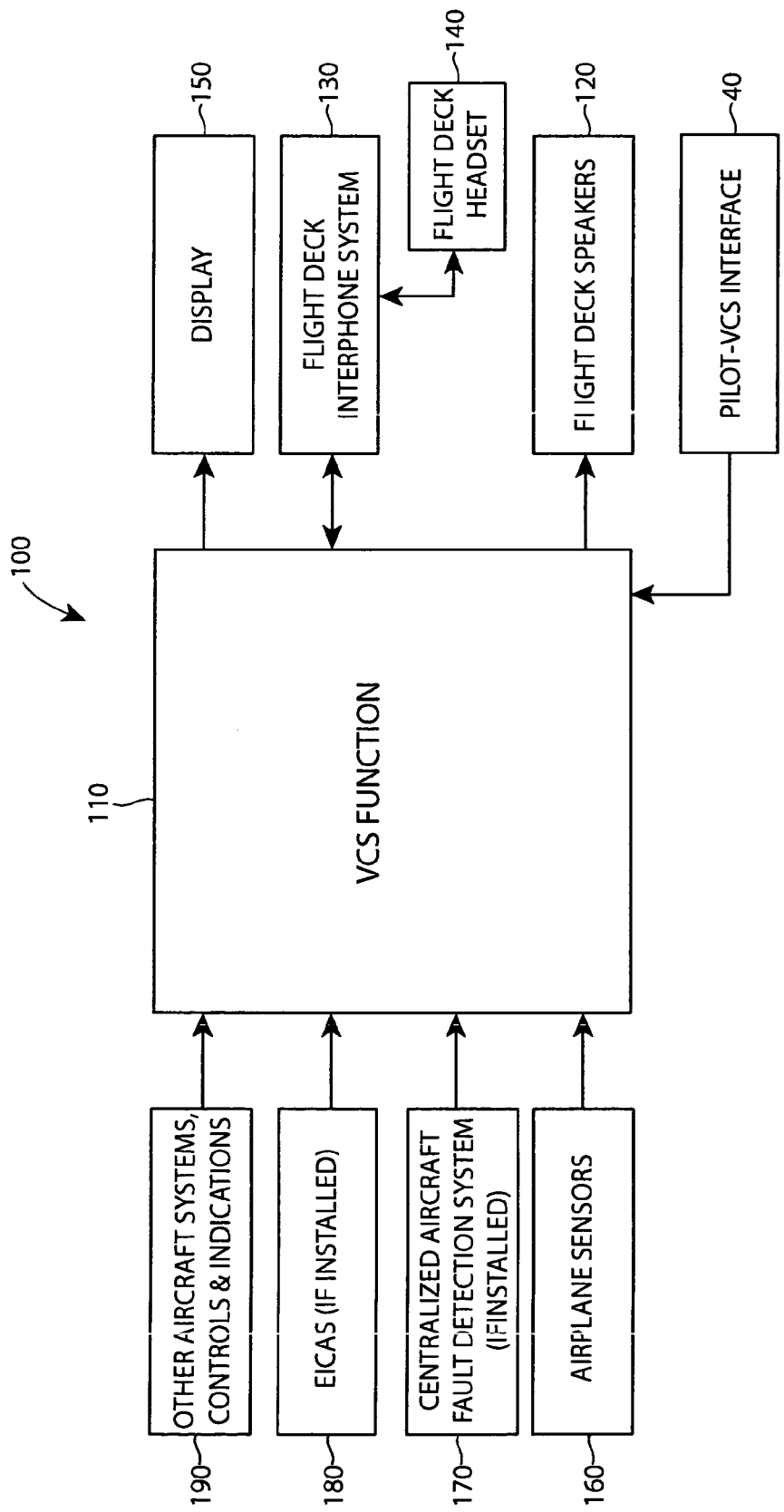
FIG. 2 is a schematic representation of one embodiment of a Voice Checklist system.

Referring now to FIG. 2, a Voice Checklist System (VCS) is generally represented by the reference numeral 100. The VCS 100 includes a VCS function 110, which may be a software program contained within a pre-existing aircraft computer system, or may be included in a stand-alone computer system. Either way, the VCS function 110 may be operatively connected to an output device, such as flight deck speakers 120 and a flight deck interphone system 130 to audibly broadcast checklist items to a pilot. The flight deck interphone system 130 may broadcast the checklist items to the pilot through the flight deck headset 140. The VCS function 110 may also be connected to a display 150 so that checklist items may be visually displayed to the pilot. The display 150 may be an electronic display and may be part of an existing electronic checklist system, any other pre-existing aircraft electronic display, or may be a stand-alone display.

The VCS function 110 may also interact with a centralized aircraft fault detection system 170 and monitor a plurality of aircraft sensors 160, including, but not limited to, air-conditioning pack temperature, hydraulic pressure, outside air temperature, aircraft speed, altitude, etc. The VCS function 110 may monitor engine performance, for example, through an Engine Indication and Crew Alerting System (EICAS) 180, if installed. Finally, the VCS function 110 may monitor any other aircraft systems, controls or indicators 190 (e.g. landing gear position, flap position, etc.).

The VCS 100 may receive an input from an aircraft centralized fault detection system 170, such as, for example, an electrical bus failure, to initiate a checklist. After receiving the input, the VCS 100 may decide via programming logic (discussed in further detail hereinafter) if it is appropriate to arm a checklist.

For example, if the aircraft experiences an electrical bus failure causing a number of system faults, the VCS 100 may decide that it is appropriate to arm an Electrical AC Bus checklist rather than a hydraulic pressure checklist (e.g., loss of hydraulic pressure due to an electrical pump shutdown). Once the VCS 100 arms the appropriate checklist, the VCS 100 may broadcast over the flight deck intercom 130, and/or the flight deck speakers 120 that the Electrical AC Bus Checklist has been armed. For example, the VCS 100 may audibly broadcast "Electrical AC Bus Checklist Standing By" via synthetic or pre-recorded voice and may simultaneously display the Electrical AC Bus Checklist on the display 150. The pilot may then initiate the first step of the checklist through use of the pilot-VCS interface device 40.

The VCS 100 may be configured in any language, accent and/or gender, as required by the user. This feature may enhance safety by allowing the pilot to hear the checklist in his/her native language.

The pilot may manually select the desired checklist via the pilot-VCS interface device 40 which may be a switch, lever, voice recognition system, keypad or any other device or system which allows the pilot to interface with the VCS 100. Once the checklist has been selected by the pilot through the pilot-VCS interface device 40, the VCS 100 may audibly broadcast over the flight deck interphone system 130 and/or the flight deck speakers 120 that the selected checklist has been armed and is standing by. The VCS 100 may also indicate on a flight deck electronic display 150 that the checklist has been selected and is ready for the first item. The pilot may then initiate the first item of the checklist through use of the pilot-VCS interface device 40.

Regardless of the method of initiation, the VCS 100 may monitor other aircraft systems for an indication that the checklist item has been completed. For example, if the first item on the Electrical AC Bus Checklist is to cycle a designated generator switch, the VCS 100 may monitor a generator switch position and indicator light for confirmation that the pilot completed the required item. Once the pilot has completed the required item, the VCS 100 may audibly broadcast the next procedural item or audibly broadcast the checklist item is complete. For example, the VCS 100 may annunciate the next possible item "If electrical bus power not restored, APU Selector to Start" or another response which indicates that the Generator switch checklist item is complete.

The VCS 100 may also indicate on the display 150 that the checklist item is complete, such as, for example, by changing the color of the checklist item, by putting a check next to the checklist item, and/or by removing the checklist item from the display 150.

Alternatively, the pilot may provide an input to the VCS 100 to indicate that a checklist item is complete through the pilot-VCS interface device 40. The pilot may activate, for example, a switch that tells the VCS 100 that the checklist item is complete. In this case, the VCS 100 may audibly broadcast via the flight deck interphone system 130 and/or the flight deck speakers 120 the next checklist item or completion of the existing item and indicate on the display the checklist item completion as in the previous example.

Regardless, if the VCS 100 has not received an indication from either one pilot or an aircraft system, control or indicator 190 that the checklist item is complete, after a predetermined amount of time, the VCS 100 may audibly re-broadcast the checklist item which reminds the pilot that the item has not been completed. The pilot may also have the option, via the pilot-VCS interface device 40, to bypass a checklist item or an entire checklist. Each successive checklist item is completed in a like manner until the entire checklist has been completed. The pilot may also have the option via the pilot-VCS interface device 40 to deactivate the voice portion and/or the visual portion of the VCS 100.

Figure 3:
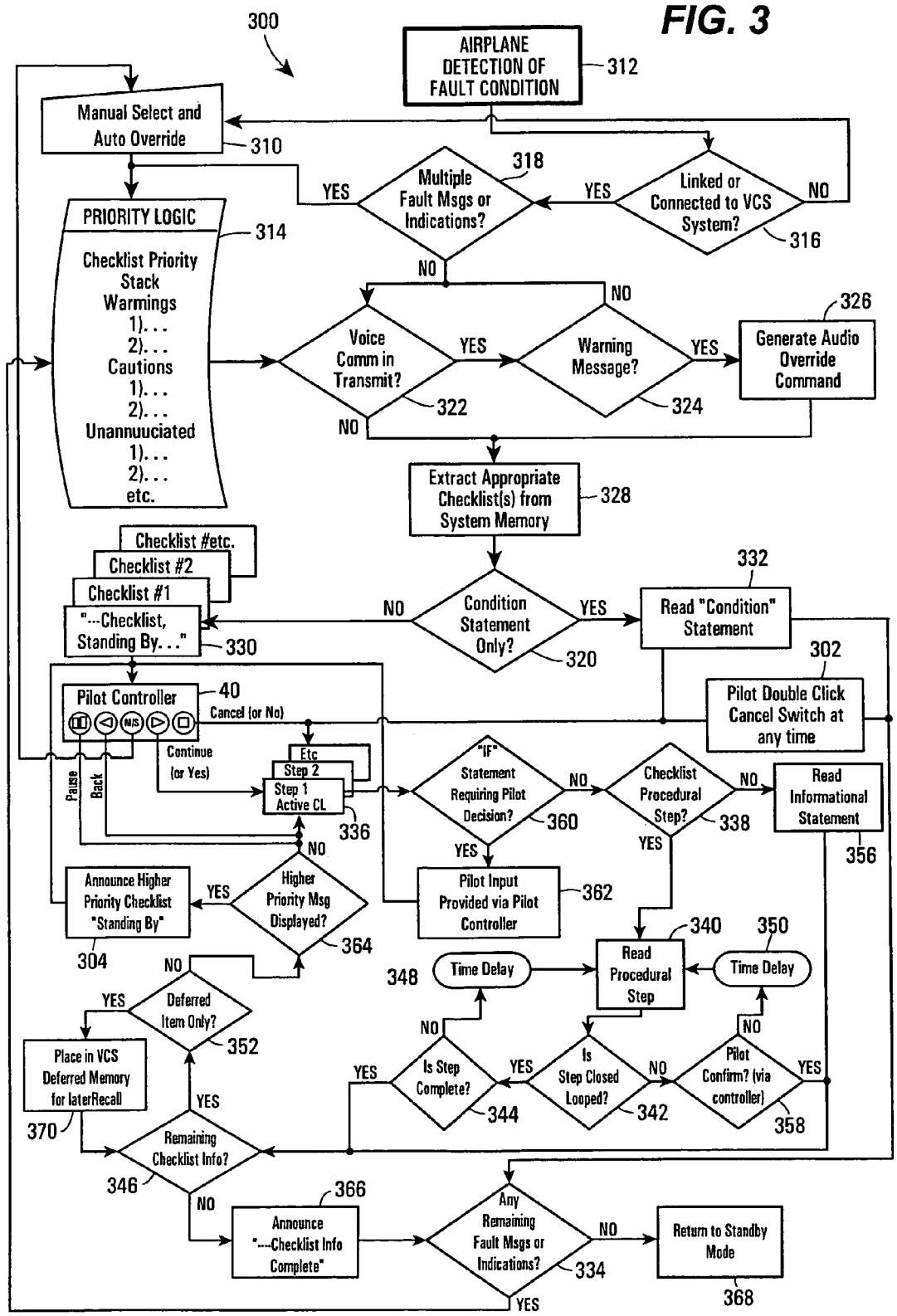
FIG. 3 is an example of a logic diagram that the Voice Checklist system may use.

Referring now to FIG. 3, an example of VCS software logic 300 is represented by a logic diagram. The VCS 100 may be activated in at least two ways; manually 310 by the pilot, or automatically (as indicated at 312 and 316) by an event which the VCS 100 detects, such as, through an aircraft system, control or indicator 190. If manually activated, the VCS 100 may allow the pilot to select any checklist available in the priority stack, as indicated at 314. This priority stack may be based on a ranking of checklist importance based on pre-programmed priority levels which may be assigned to the checklists based on manufacturer and/or use preferences. For example, an engine fire checklist may be given a higher priority than a hydraulic pump pressure checklist. Manual selection 310 may also have priority over the alternative automatic selection process starting at 316. Alternatively, a non-normal event, which may result in several fault messages or indications being active at the same time, may cause the VCS 100 to begin to determine how many checklists need to be accomplished, as indicated at 318. If there are multiple fault messages, or indications the VCS 100 may use priority logic to select and prioritize the required checklists, at 314.

After the checklists have been priority stacked at 314, the VCS 100 may determine if the pilot is currently transmitting voice communications at 322, such as, for example, the pilot may be talking to Air Traffic Control on a radio or communicating with the cabin crew via the aircraft intercom system or public address system. In this case, the VCS 100 may be programmed to not interrupt the pilot while he/she is using voice communications at 322. If the checklist is important enough, based on a pre-programmed priority, the VCS 100 may generate an audio override command at 326 for use by the aircraft audio system to enable override of the voice transmission.

In the logic embodiment of FIG. 3, the VCS 100 may determine that if, for example, the indication warrants immediate action at 324, the VCS 100 may generate an audio override command at 326 for use by the aircraft audio system. If the indication does not warrant immediate action at 324, the VCS 100 may simply stand-by until the pilot is no longer transmitting voice communications at 322. The user may program a certain amount of time for the VCS 100 to wait after voice communications have ceased before proceeding to extract the checklist from the VCS 100 system memory at 328.

Once the VCS 100 has extracted the checklist from system memory at 328, the VCS 100 may determine if the checklist contains actions or condition statements at 320. If the checklist contains only condition statements, the VCS 100 may audibly broadcast the condition statements at 332 via the flight deck interphone system 130 and/or the flight deck speakers 120. After the condition statements have been broadcast at 332, the VCS 100 may monitor the EICAS 180 or the aircraft centralized fault detection system 170 for additional fault messages or indications at 334. If additional fault messages or indications remain at 334, the VCS 100 may select the highest priority checklist remaining at 314 and proceed as previously described to the voice communication check. If the checklist contains actions, or actions and condition statements, the VCS 100 may audibly broadcast that the checklist is standing by at 330. For example, the VCS 100 may annunciate "Left Electric Hydraulic Pump Checklist standing by" over the flight deck interphone system 130 and/or the flight deck speakers 120.

The pilot may control the VCS 100 through the pilot-VCS interface device 40. The pilot may initiate the first checklist item, confirm accomplishment of checklist items, skip checklist items, pause the checklist, backup to the previous item, or cancel the checklist all through the pilot-VCS interface device 40. The VCS 100 may access the next active checklist item at 336 and inspect to determine if it requires a pilot decision at 360, for example "If anti-ice required . . . " If a decision is required, the pilot may provide "yes" or "no" input at 362 via the pilot-VCS interface device 40. If a pilot decision is not required, the VCS 100 may determine at 338 if the next item in the checklist is a procedural step, or an information statement at 338. If the item is a procedural step, the VCS 100 may audibly broadcast the procedural step at 340 via the flight deck interphone system 130 and/or the flight deck speakers 120.

The VCS 100 may determine if the item is a closed loop step at 342. A closed loop step is a checklist item in which the VCS 100 automatically monitors for completion through aircraft systems, indicators and/or controls 190, the EICAS 180, or aircraft sensor 160. If the checklist item is a closed loop step, the VCS 100 receives an indication of checklist item completion at 344. For example, the VCS 100 may monitor an Autothrottle Arm Switch to determine if the switch has been placed in the OFF position during the Engine Failure checklist. If the VCS 100 receives an indication that the closed loop step has been completed at 344, the system determines if there is any information or items remaining in the current checklist at 346. If, however, the VCS 100 receives no indication that the closed loop step has been completed, a timer may begin timing at 348, and after a pre-determined amount of time (the amount of time may be different for any given checklist or item within a checklist depending on the importance of the checklist and/or checklist item), the checklist item may be audibly broadcast again at 340. This second broadcast may be of higher volume, different voice inflection, or any other way which informs the pilot that this is a second, or subsequent broadcasting of the checklist item.

If the checklist item at 342 is not a closed loop, meaning the VCS 100 has no capability to automatically monitor the step for completion, the pilot may confirm the completion of the item at 358 via positive input from the pilot-VCS interface device 40. A timer may again begin timing at 350 if the pilot has not confirmed completion of the item. As with the timing at 348, the amount of time may be pre-determined and different for each checklist and or item within the checklist based on importance and/or average time to complete the item. The checklist item may be audibly broadcast again at 340.

Once the checklist item has been completed, the VCS 100 may determine if there are items or information remaining in the checklist at 346. If there are items or information remaining, the VCS 100 may check at 352 to determine if the remaining items or information are deferred items only. Deferred items are those items held until later in the flight before completion. For example, certain hydraulic failures may require use of an alternate system to lower the landing gear and/or extend the flaps. The procedure(s) for doing so are listed as deferred, since they are only required before landing. If only deferred items remain, the VCS 100 may place them in a Deferred Memory 370 for manual or automatic recall later in the flight. After placing the items in the Deferred Memory 370, the VCS 100 may determine no additional checklist information remains at 346 and announce completion of the checklist at 366.

If information is remaining at 346, but includes other than deferred items, the VCS 100 may check at 364 for any higher priority messages that may have occurred during execution of the last completed checklist item. If no higher priority messages have occurred, the VCS 100 may continue the checklist at 336. If a higher priority message is available at 364, the VCS 100 may announce the higher priority checklist as "Standing By" at 304. The pilot then has the option, via the pilot-VCS interface device 40, of either canceling the new checklist and continuing the current checklist, or initiating the first item of the new checklist.

If the checklist is not a procedural step at 338, the item must be an informational statement which the VCS 100 may audibly broadcast at 356 via the flight deck interphone system 130 and/or the flight deck speakers 120 and the VCS 100 may then determine if any items and or information remain at 346.

If the VCS 100 determines there is additional information or procedural steps remaining at 346 and the items remaining include other than deferred items 352 and there is no higher priority message available at 364, the VCS 100 repeats the process using the next item on the active checklist at 336.

When there is no remaining checklist information at 346, the VCS 100 may announce checklist complete at 366. At this time, the VCS 100 may again monitor aircraft systems and respond to any fault messages or indications that remain at 334. If none remain, the VCS 100 may return to a standby mode at 368. If fault messages or indications remain, the VCS 100 may return to step 314 and begin the steps described above.

In any of the above embodiments, the pilot-VCS interface device 40 may include voice recognition technology. That is, the pilot may interface and control the VCS 100 simply by speaking. This technology, while not required, may enhance and speed up operation of the VCS 100. Such a voice recognition device may include a microphone to receive the pilot's voice commands and voice recognition software, in addition to the other elements listed above.

Although the preferred embodiments of the invention have been disclosed for illustrative purposes, those skilled in the art will appreciate that various modifications, additions and substitutions are possible, without departing from the scope and spirit of the invention as disclosed herein and in the accompanying claims. For example, the checklist system may be adapted for use in conjunction with any device or facility, the operation of which may use a checklist, such as, for example, a ship, a power plant, a chemical plant, a manufacturing facility, a space vehicle, an automobile, a truck or a train.

What is claimed is:

1. A system for facilitating a checklist procedure for use in a vehicle comprising:
    a processor that runs a software program;
    a memory accessible by the processor;
    an output device;
    a user interface device; and
    at least one sensor for sensing a condition of the vehicle and providing an input to the software program;
    wherein the memory contains a checklist, including one or more checklist items and control logic,
    wherein the software program accesses the memory, prioritizes the checklists and indicates a first checklist item over the output device,
    wherein conditions of the vehicle are monitored via the at least one sensor and a second checklist item is indicated over the output device based on the input from the at least one sensor indicating the first checklist item is complete.

2. The system of claim 1, also including an electronic display.

3. The system of claim 2, wherein the electronic display is one of a touch screen display, a cathode ray tube (CRT), a plasma screen display, a liquid crystal display (LCD), or other type of electronic display commonly found in vehicles.

4. The system of claim 3, wherein the user interface device is the electronic display.

5. The system of claim 1, wherein the user interface device is a switch.

6. The system of claim 1, wherein the processor is part of another vehicle system.

7. The system of claim 1, wherein the processor is separate from other vehicle systems.

8. The system of claim 1, wherein the at least one sensor detects the condition of at least one of a vehicle system, an engine, a vehicle control and an environment in which the vehicle is operating.

9. The system of claim 8, wherein the vehicle is an aircraft.

10. The system of claim 9, including an input from an engine indication and crew alerting system (EICAS).

11. The system of claim 9, wherein the checklist is armed based on an input from the at least one sensor.

12. The system of claim 9, wherein the checklist is armed based on an input from the user.

13. The system of claim 12, wherein the output device is part of an interphone system.

14. The system of claim 13, wherein the output device is part of an aircraft flight deck interphone system.

15. The system of claim 1, wherein the first checklist item is indicated over the output device in a computer generated synthetic voice.

16. The system of claim 1, wherein the first checklist item is indicated over the output device in a pre-recorded voice.

17. The system of claim 1, wherein the output device is a speaker.

18. The system of claim 1, including a microphone for receiving a pilots voice commands and voice recognition software.

19. A method for audibly indicating a checklist procedure in a vehicle, the method comprising:
    receiving a first input;
    prioritizing a first checklist;
    indicating the first checklist item with an output device;
    receiving a second input which indicates the first checklist item is complete from a sensor which senses a condition of the vehicle;
    indicating a second checklist item with the output device based on the second input.

20. The method of claim 19, wherein the first input is received from a vehicle sensor.

21. The method of claim 20, wherein the vehicle sensor is part of an engine indication and crew alerting system (EICAS).

22. The method of claim 19, including the step of displaying the first checklist item on an electronic display.

23. The method of claim 19, wherein the first input is generated by a user interface device.

24. The method of claim 23, wherein the user interface device is an electronic display which includes touchscreen technology.

25. The method of claim 24, wherein the electronic display is one of a touch screen display, a cathode ray tube (CRT), a liquid crystal display (LCD) and a plasma display.

26. The method of claim 19, including the step of prioritizing more than one checklist.

27. The method of claim 19, wherein the indication of the first checklist item is repeated if the second input is not received within a pre-determined time period.

28. The method of claim 27, wherein a feature of the repetition of the indication of the first checklist item is distinctly different from a feature of the first indication of the first checklist item.

29. The method of claim 28, wherein the feature is the volume of an audible broadcast.

30. The method of claim 28, wherein the feature is the inflection of an audible broadcast.

31. The method of claim 19, wherein the vehicle is an aircraft.

32. The method of claim 19, wherein the output device is a speaker.

33. A system for audibly broadcasting a checklist procedure comprising:
- a processor that runs a software program;
- a memory accessible by the processor;
- an output device;
- a user interface device; and
- at least one sensor for sensing a condition of the vehicle and providing an input to the software program;
- wherein the memory contains a checklist, including one or more checklist items,
- wherein a user controls the system through the user interface device, and
- wherein the software program accesses the memory, prioritizes the checklists and provides a first checklist item indication via the output device, and
- wherein conditions of the vehicle are monitored via the at least one sensor and a second checklist item is indicated over the output device based on the input from the at least one sensor indicating the first checklist item is complete.

34. The system of claim 33, including an electronic display.

35. The system of claim 34, wherein the user interface device is the electronic display.

36. The system of claim 33, wherein the user interface device is a switch.

37. The system of claim 33, wherein the processor is part of another system.

38. The system of claim 33, wherein the processor is separate from other systems.

39. The system of in claim 33, wherein the first checklist item is broadcast over a speaker in a computer generated synthetic voice.

40. The system of claim 33, wherein the first checklist item is broadcast over a speaker in a pre-recorded voice.

* * * * *